United States Patent [19]
Smith et al.

[11] Patent Number: 5,111,005
[45] Date of Patent: May 5, 1992

[54] GRAPHICS TABLET WITH N-DIMENSIONAL CAPABILITY

[75] Inventors: Paul D. Smith, New Canaan; Michael J. Padula, Sandy Hook; Robert M. McDermott, Weston, all of Conn.

[73] Assignee: Summagraphics Corporation, Seymour, Conn.

[21] Appl. No.: 592,796

[22] Filed: Oct. 4, 1990

[51] Int. Cl.⁵ .................................... G08C 21/00
[52] U.S. Cl. ........................... 178/19; 340/710
[58] Field of Search .................. 178/18, 19, 20; 340/710, 709, 706

[56] References Cited

U.S. PATENT DOCUMENTS

| | | | |
|---|---|---|---|
| 4,506,336 | 3/1985 | Hird | 364/518 |
| 4,524,348 | 6/1985 | Lefkowitz | 340/365 R |
| 4,593,470 | 6/1986 | Davies | 33/1 CC |
| 4,600,200 | 7/1986 | Oka et al. | 273/313 |
| 4,661,810 | 4/1987 | Himelstein et al. | 340/709 |
| 4,687,885 | 8/1987 | Talmage, Jr. et al. | 178/18 |
| 4,707,572 | 11/1987 | Kable et al. | 178/18 |
| 4,739,303 | 4/1988 | Kobayashi | 340/346 |
| 4,748,441 | 5/1988 | Brzezinski | 340/709 |
| 4,786,764 | 11/1988 | Padula et al. | 178/19 X |
| 4,786,892 | 11/1988 | Kubo et al. | 178/18 X |
| 4,814,552 | 3/1989 | Stefik et al. | 178/18 |

Primary Examiner—Stafford D. Schreyer
Attorney, Agent, or Firm—Rosen, Dainow & Jacobs

[57] ABSTRACT

A digitizer tablet and puck(cursor) for use therewith, characterized that in one aspect the puck is provided with at least one additional control which will provide the user with the ability to control at least one N-dimensional signal in addition to the normal X-Y coordinate data. In accordance with another aspect, any pointing device for the tablet is provided with the capability to control the manner in which the N-dimensional signal varies in response to user manipulation of the pointing device.

25 Claims, 8 Drawing Sheets

FIG. 5
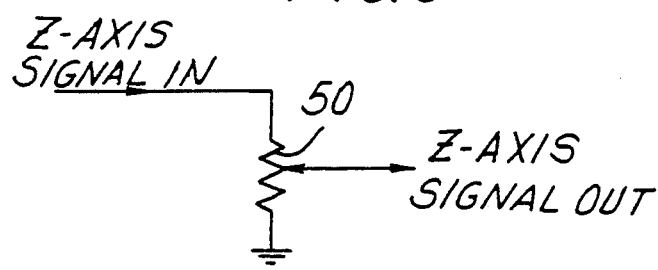
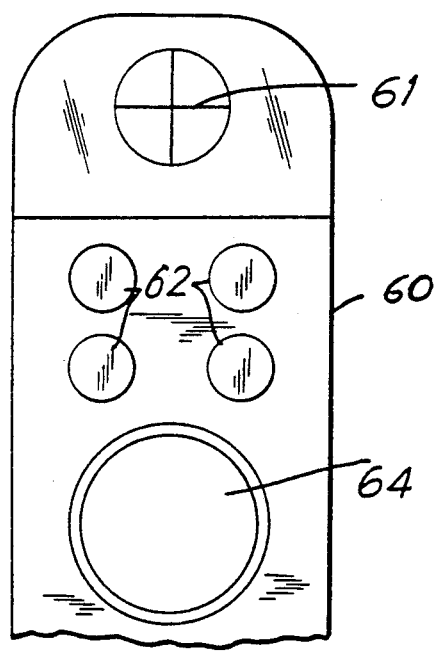
FIG. 6
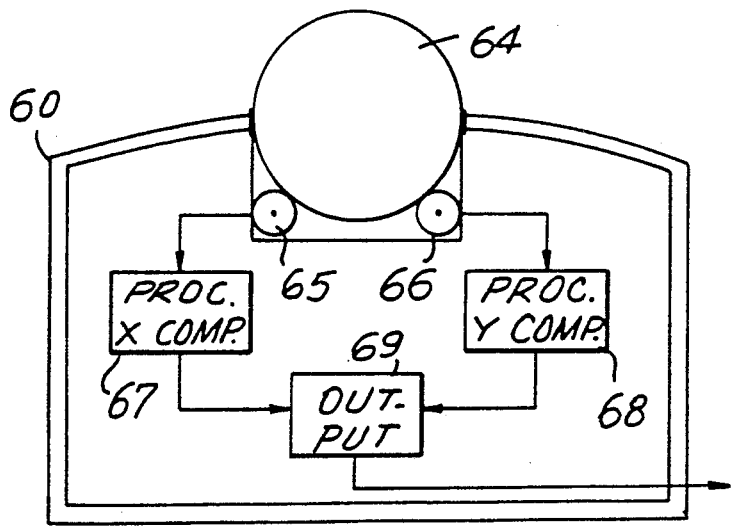
FIG. 7

FIG. 8
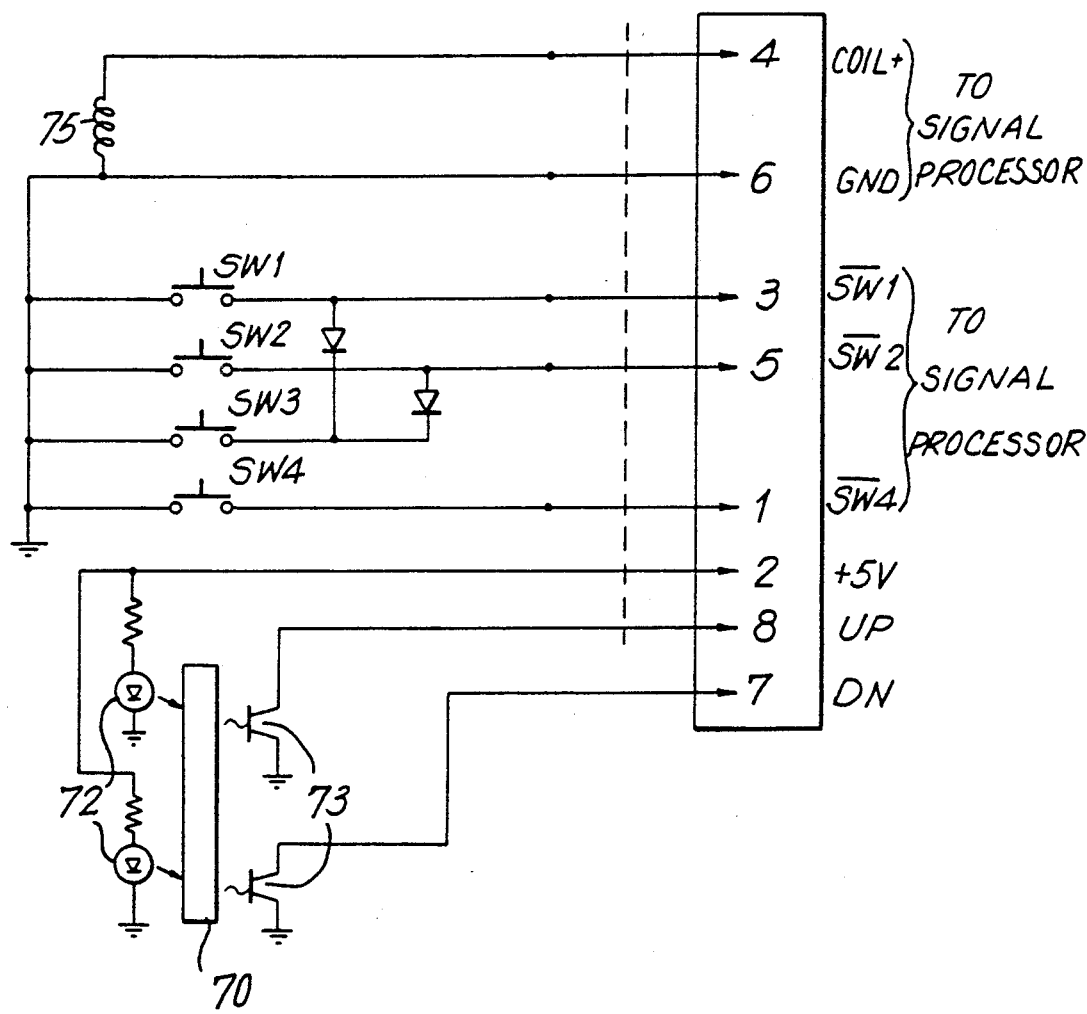
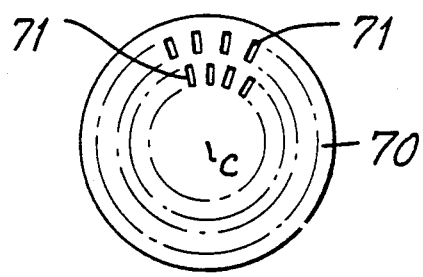
FIG. 8A

GRAPHICS TABLET WITH N-DIMENSIONAL CAPABILITY

This invention relates to a graphics tablet which employs a pointing device with which it cooperates to generate position coordinates of the location of the pointing device with respect to the tablet. It relates specifically to a digitizer tablet using a pointing device providing N-dimensional capability or Z-axis control in addition to the normal outputting of X and Y coordinates.

BACKGROUND OF INVENTION

Graphics or digitizer tablets are well known in the art. See, for example, the January 1989 issue of BYTE magazine, pages 162-174. The pointing device typically used is a pen or stylus, or a cursor, also called a puck. Puck will be used herein to avoid confusion with a display or CRT screen cursor. The puck frequently comes equipped with buttons connected to switches. The tablet is usually connected to a computer with a display, and the puck plugs into the tablet. In a typical application, when activated, as the puck operated by the user follows, for example, a line drawing, the puck X-Y coordinates outputted to the computer are processed and cause the screen cursor to follow the puck, so that a replica of the line drawing is produced on the screen. The puck buttons often serve control or command functions, such as telling the tablet when to start and stop outputting X-Y coordinates, or when to recognize a valid puck position.

It is also known to convert stylus pressure as applied by the user into a control function for the tablet or computer. See, for example, U.S. Pat. Nos. 4,806,707 and 4,687,885. In the former, disposed within the pen body is an optical linear position transducer acted on by the pen tip to generate a Z-axis signal proportional to linear movement of the pen tip. In the latter patent, a Z-axis signal is generated by building into the tablet special resistive coatings determining the signal value as a function of the user's pressure. Both of the mechanisms described in these patents suffer from the problem that the Z-axis signal depends upon the ability of the user to manipulate the pen and apply the necessary pressure to achieve a desired Z-axis signal output. Moreover, the Z-axis signal is typically outputted either once, or continuously, provided that the user maintains continuously the pressure.

Reference is also made to commonly-assigned U.S. Pat. No. 4,786,764, which describes a stylus with a pressure transducer in the form of an ink layer having electrical resistance, providing an analog Z-axis output signal as a function of user pressure.

SUMMARY OF INVENTION

An object of the invention is a digitizer tablet with a pointing device providing N-dimensional output information, where N is 3 or greater.

A further object of the invention is a digitizer tablet having a puck capable of providing a signal output representative of one or more parameters in addition to X-Y coordinate data.

Still another object of the invention is a novel, versatile puck for a digitizer tablet, with button controls for tablet or computer functions, and with a control to provide the user with the capability of providing full 3-axis or 3-dimensional or higher manipulation or design of an object being drawn by use of the tablet.

Still a further object of the invention is an N-dimensional pointing device, puck or stylus, having button switches for varying continuously over a desired range the magnitude of an outputted signal, which is configurable such that changes in the outputted signal magnitude is ergonomically related to the user's operation of the pointing device.

These and further objects and advantages of the invention as will appear hereinafter are achieved in accordance with one aspect of the invention by providing on the tablet puck a control, manipulable by the user, which cooperates with circuitry of the tablet to generate signals representative of one or more additional axes or dimensions or parameters of the system. Used with a typical tablet generating X-Y coordinate data, the additional signal could represent Z-axis data or another parameter as determined by the user. Additional controls can be provided on the puck to afford the user the capability of generating outputs representing a fourth or higher dimension of some object.

In one preferred embodiment in accordance with this aspect of the invention, the puck with or without control buttons is provided with a trackball mounted for relative movement on the puck. Movement of the puck in the usual way will output X-Y coordinate data. Movement of the trackball by the user, while the puck is moving or at rest, will enable the user to output additional signals representative of at least one attribute of an object being created, other than its dimensions in the X-Y plane.

In another preferred embodiment, the puck is provided with a thumbwheel operable by the user and cooperating with appropriate circuitry to allow the continuous generation of additional signals representative of parameters other than the X-Y coordinate data of the puck position.

A commonly-assigned patent application, Ser. No. 436,196, filed 11-13-89, U.S. Pat. No. 5,004,871, by a co-worker, describes a stylus with a side switch manipulable by a user for providing an output related to the magnitude of the user applied pressure to the switch. Preferably, the switch is spring mounted so that the switch returns to a rest position when the user's pressure ceases.

An advantage of associating the control feature of this aspect of the present invention with a puck, as distinguished from a stylus, is that the usual puck with its crosshair reticle provides a very accurate means for tracing or creating a drawing of an object in a CAD-CAM or graphic arts environment, and thus will simultaneously now allow the user to add accurately additional information, such as color or shading or line thickness, to the drawing of the object. It also greatly assists in accurately adding a third dimension to the display of the object on the screen. Still further, in the preferred embodiments, the control of the invention retains the position last established by the user, so that the control output continues at the last established value whether or not the user maintains a hands-on condition with the puck. This feature will be of special benefit to graphics arts users.

In accordance with a further aspect of the invention, the pointing device can be a stylus or puck provided with button switches for controlling the magnitude or intensity of the outputted Z-axis signal. Again, an object is for the Z-axis signal output to remain unchanged from its last selected position. One possible way of implementing this aspect is for each button press to increment or decrement the value of a circuit component that modifies the Z-axis output signal.

A preferred embodiment in accordance with this aspect of the invention is to broaden the range of signal intensities possible but without placing undue demands on the user. In the preferred embodiment, this object is achieved by utilizing a button closure time parameter to determine the magnitude of the change produced. In addition, or as an alternative, several different functional relationships of button operation to signal effect can be built into the tablet or pointing device, with the user given the possibility of selecting a desired functional relationship to be implemented for a specific given application.

SUMMARY OF DRAWINGS

The invention will now be described in greater detail with reference to several preferred embodiments taken in configuration with the accompanying drawings, wherein:

FIG. 5 is a circuit detail illustrating operation of the puck of FIG. 4;

FIGS. 6 and 7 are a plan and schematic sectional view of still a further modification of a digitizer puck in accordance with the invention;

FIG. 8 is one form of circuit usable with the puck of FIGS. 4, 6 and 7;

FIG. 8A schematically illustrates an encoder wheel for use in the FIG. 7 embodiment;

DETAILED DESCRIPTION OF PREFERRED EMBODIMENTS

Before proceeding with the detailed description, it will be appreciated that, while certain specific ways of implementing the control of the invention, electrically, mechanically, and circuit-wise, are preferred and will be described in detail, the invention is not limited thereto, and any kind of device that will convert rotary or linear motion into an electrical signal output representative of the value or some other attribute of a rotary or linear control element can be employed. These include, for example, mechanical, optical and magnetic analog switches, as well as those analog-outputting embodiments described in application. Ser. No. 436,196, whose contents are incorporated herein by reference.

Figure 1:
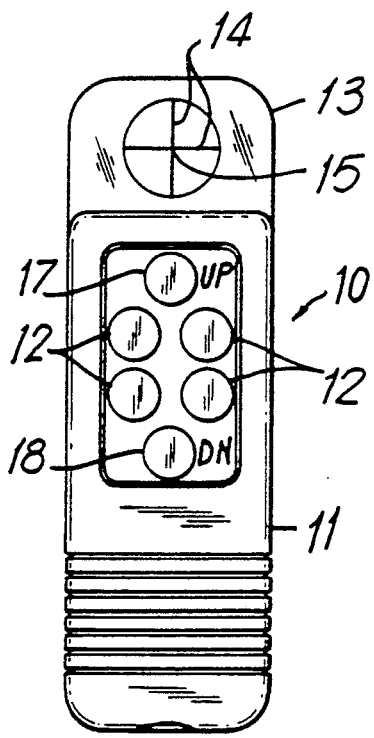
FIG. 1 is a plan view of one embodiment of a digitizer puck in accordance with the invention.

Referring now to the drawings, FIG. 1 shows one embodiment of a digitizer puck in accordance with the invention. The puck, designated 10, comprises a housing 11 by which the user can hand-manipulate the puck over the surface of a conventional digitizer tablet (not shown). The puck will contain the usual flexible cable (not shown) for plugging same for connection into the digitizer tablet. Any conventional kind of digitizer tablet can be used in conjunction with the puck of the invention. It merely requires the provision of additional circuitry, as will be explained below, to process the Z-axis signals. Reference is made to co-owned U.S. Pat. Nos. 3,647,963, 3,904,822, and U.S. Pat. No. 4,705,919, which describes several forms of conventional digitizer tablets employing electromagnetic and electrostatic technology, but it will be understood that the invention is not limited thereto.

The puck 10 comprises four buttons 12, which is a standard arrangement, with each of the buttons designated to perform some desired control or command function for the tablet. In addition, the puck 10 has at its forward end a transparent frontpiece 13 which contains crosshairs 14 centered within a coil (not shown) which is conventional in an electromagnetic type of digitizer. As will be clear from the referenced publication and patents, electrode arrays mounted in the tablet surface cooperate with the coil to generate signals that are representative of the X and Y coordinate positions of the center 15 of the crosshairs 14 over the tablet surface. Again, this signal processing is conventional. The usual puck buttons 12 are used by the user to transmit command or control signals to the tablet to control when and how the X/Y coordinate information is generated, formatted and transmitted to a PC or workstation to which the tablet is connected.

Figure 2:
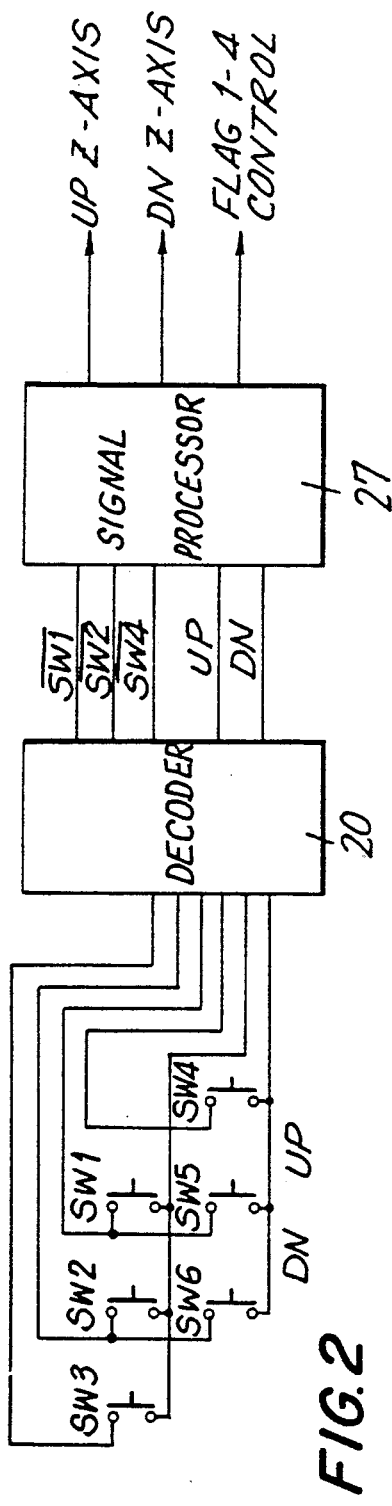
FIG. 2 is an electrical schematic drawing illustrating one form of control circuitry for use with the puck of FIG. 1.

In accordance with the invention, the puck 10 is provided with two additional buttons 17 and 18 labelled UP and DN (abbreviation for DOWN). FIG. 2 illustrates one form of circuit suitable for use with the puck of FIG. 1. Each of the buttons on the puck 10 constitutes a normally-open switch SW1-SW6, which closes when the button is pressed. As is conventional, a decoder chip 20 is used to convert the switch closures to one-of-five outputs representing one of the control switch closures (SW1, SW2, SW4) and either the UP or DN switch closure (SW3 is recognized by both SW1 and SW2). The outputs are supplied to a conventional microcontroller 27. The microcontroller 27 conventionally processes the X/Y coordinate signals as well as the control/command signals from the puck. The processing of the signals generated when one of the usual control buttons 12 is pressed is conventional. The present invention concerns the signal processing when one of the added buttons 17 or 18 is pressed. The output as shown in FIG. 2 includes signals representing the Z-axis signals and flags representing the control buttons.

In accordance with this aspect of the invention, the tablet is continuously generating a signal representing a desired Z-axis value. This can be set during initialization of the tablet as a default value, or be user selected via a usual set-up menu during installation. The two extra buttons allow the user to increment or decrement by a preset amount the value of the generated Z-axis signal.

Figure 3:
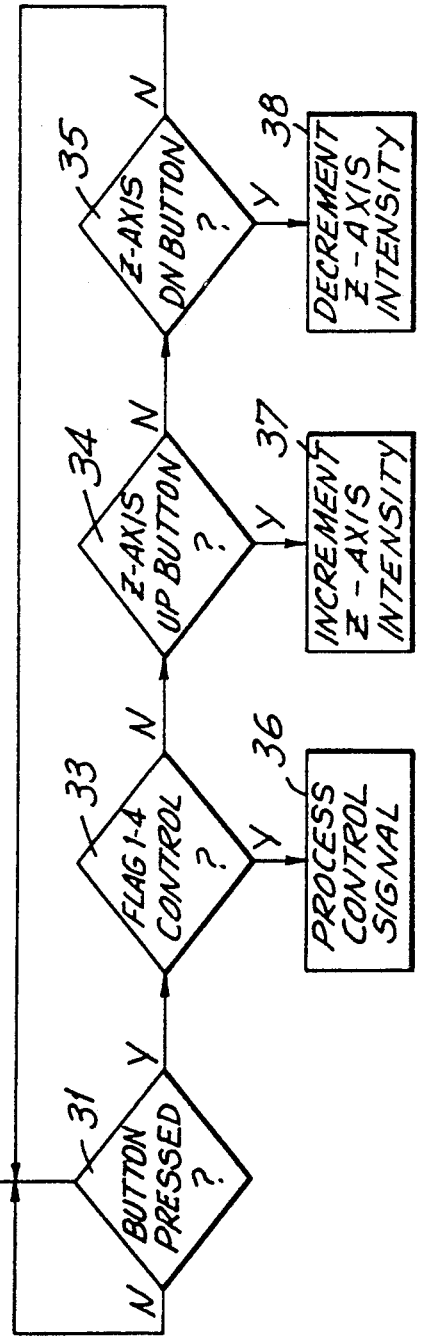
FIG. 3 is a flow diagram of one form of program suitable for use with the puck of FIG. 1.

FIG. 3 is a flow diagram illustrating its operation. When the tablet is energized, an initialization of the tablet represented by block 30 takes place. This will place the tablet in the user-desired mode of operation, and generate, in addition to the usual X/Y coordinate data for the puck location, a constant value Z-axis signal. The microcontroller can then be programmed in a conventional manner to poll 31 the various switches to determine whether a button has been pressed. Alternatively, the microcontroller can be programmed such that any button pressed causes a system interrupt which causes the microcontroller to jump to a routine to process the pressed button signal. FIG. 3 illustrates one typical way of processing a pressed button signal, which is done by testing whether the signal is from one of the four control buttons 12 in block 33, or originates from the UP button 17 (block 34) or the DN button 18 (block 35). If the signal originated from one of the control buttons 12, it is processed (block 36) in the usual way. If it originated from the UP button 17, the signal activates a conventional incrementer 37 which increments the value of the outputted Z-axis signal by a preset amount. Alternatively, if the signal originated from the DN button 18, then the Z-axis signal is decremented 38 preferably by the same fixed amount.

In a typical drawing application, the outline of the figure to be drawn would be established by the user moving the puck 10 over the tablet surface, using the control buttons 12 to determine when a line should begin and when it should end. The line width of the display would be determined by the Z-axis output signal value. When the user desires to broaden the line, he or she (s/he) need only press button 17. Each button press would increase the line width by a fixed amount. When the button pressure is removed, the last chosen line width remains for all future drawn lines until the user again presses the UP button 17 or the DN button 18. The DN button operates similarly but in reverse, decreasing the line width in preset amounts until s/he stops pressing the button, at which time the last selected line width remains. Alternatively, the UP or DN button can be held down, with the Z-axis output being continuously incremented or decremented until the button is released. In other words, the software can be designed to respond to the number of keypresses, or the down holding time of the key.

The invention is not limited to using the Z-axis output to control line width on a display. It can also be used to select a different line color, or a different line shade, or a different line tint. The circuitry or microcontroller programming for performing these functions will be evident to those skilled in the art.

The Z-axis output signal can also be used to represent a third dimension of the object being drawn. Thus, the UP button signal could be used to draw a line in the positive Z-direction, assuming an X-Y-Z coordinate system, and the DN button signal used to draw a line in the negative-going Z-direction as desired. Again, the circuitry or programming of the microcontroller to accomplish this is straightforward and will be evident to those skilled in the art.

Figure 4:
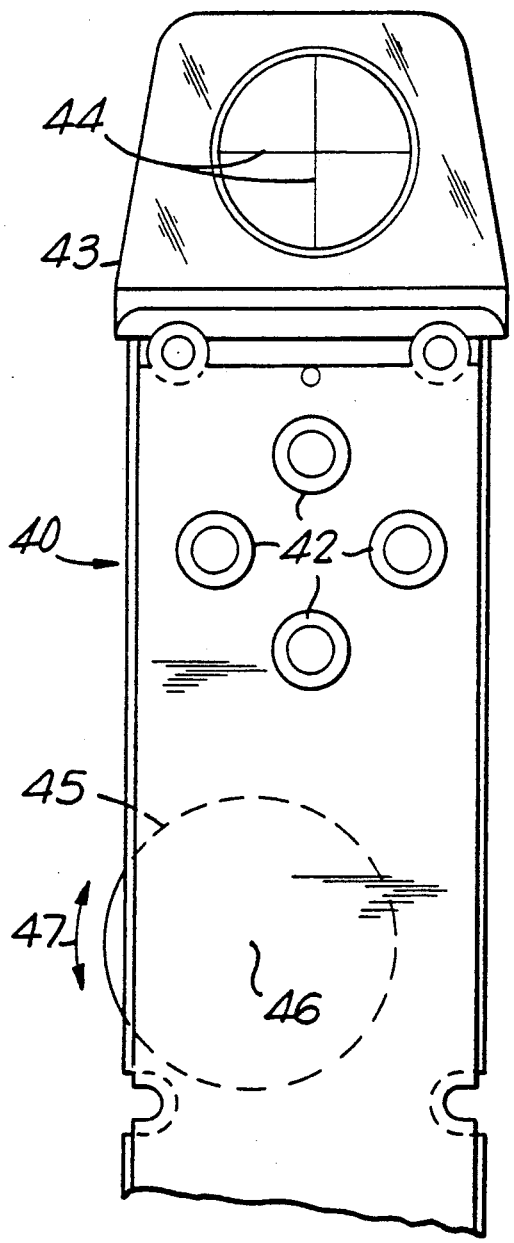
FIG. 4 is a partial plan view of a modified puck in accordance with the invention.

In the embodiment described in connection with FIG. 1, the analog control associated with the puck of the invention is in the form of button switches which when closed increment or decrement in a stepwise manner the value of an outputted Z-axis signal. In the embodiment described next, the Z-axis signal intensity is varied on a continuous basis using a conventional potentiometer mounted on the puck. This is illustrated in FIG. 4, which shows a puck 40 having the usual housing 41 with the four conventional control/command buttons 42. The puck has at its front end a transparent piece 43 containing the usual crosshair reticle 44. Below the control buttons 42 is mounted a conventional potentiometer 50 (see FIG. 5) having a thumbwheel 45 mounted on its shaft. The thumbwheel 45 can be rotated by the user in a plane parallel to the cursor reticle 44, about a vertical axis 46, as indicated by the arrows 47. In this case, the Z-axis generated signal would be connected to the potentiometer 50 so that its outputted value varies in accordance with the potentiometer setting selected by the user.

FIGS. 6 and 7 show still another embodiment in accordance with this aspect of the invention using a conventional trackball control. FIG. 6 shows a typical puck 60 with the usual crosshairs 61 and the standard 4-button controls 62. Below the buttons 62 is mounted a conventional trackball 64. FIG. 7 schematically shows the operation. The trackball 64 typically engages known incremental optical encoders having resilient pick-off wheels 65, 66 which are friction driven by the ball and are used to supply the "X" and "Y" motion components of the ball 64 in the form of analog signals. Those can be processed 67, 68, combined 69 and outputted, or outputted separately. Appropriate circuitry, well known to those skilled in the art, can be used to interpret the signals as the user desires. For example, with separate outputs, trackball movements say in the N-S direction can modify line width, and trackball movements in the E-W direction line color or some other attribute. The use of optical encoders to translate motion into analog values is not limited to the trackball embodiment. It can also be used in the FIG. 4 embodiment in place of the potentiometer. Thus, rotation of the thumbwheel would cause rotation of the encoder pick-off wheel thereby generating a signal representative of the amount of movement or rate of movement, either or both of which can be used to control a parameter of the display.

FIG. 8 shows a circuit similar to FIG. 2 for processing signals from the trackball embodiment of FIGS. 6 and 7. The trackball rotates one or more encoder wheels 70. A typical encoder wheel with rows of out of phase slots 71 is shown in FIG. 8A. Light emitting diodes 72 illuminate one side of the encoder wheel 70. Phototransistors 73 are positioned on the opposite side. The motion of the trackball is converted into a rotation of the wheel 70, and the light detected by the phototransistors 73 through the passing slots 71 can be interpreted as up or down Z-axis signals. The circuitry also shows the control buttons represented by switches SW1-SW4, and an inductor 75 representing the coil surrounding the crosshairs of the puck. The resultant signals are conveyed to a signal processor such as 27 in FIG. 2 and processed in the manner previously described.

Figure 9:
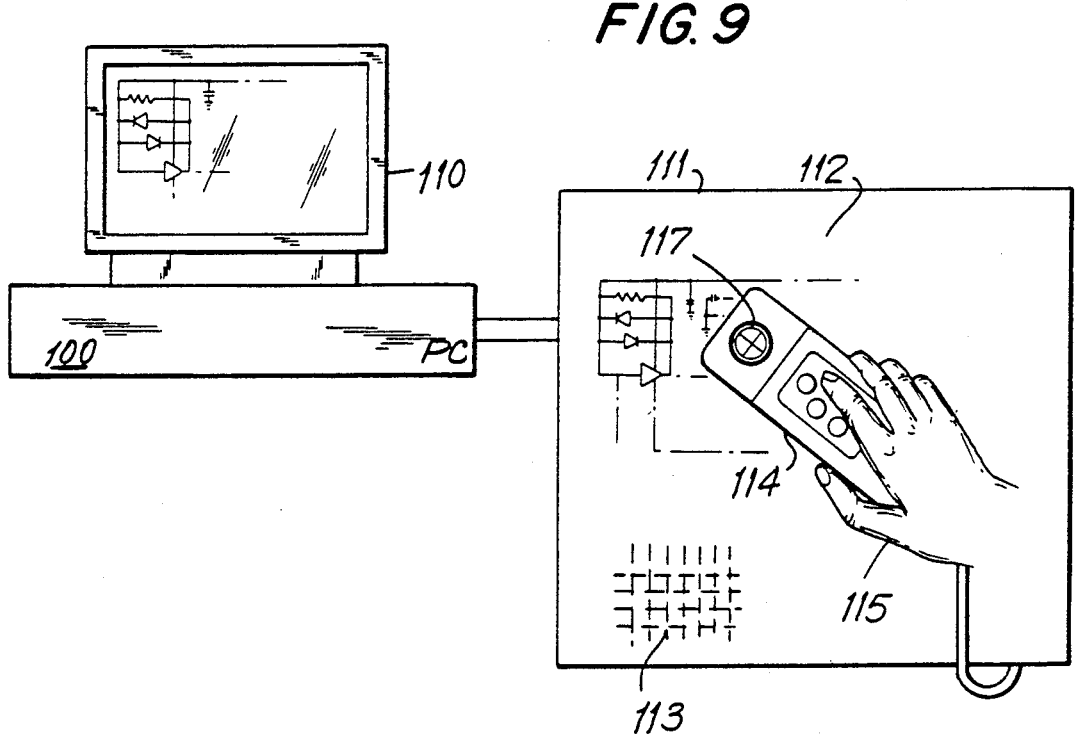
FIG. 9 is a schematic diagram illustrating a typical workstation employing a digitizer tablet and puck for creating drawings.

FIG. 9 schematically illustrates a typical graphics system comprising a PC 100 having a display monitor 110. The PC console is connected to a digitizer tablet 111 having under its working surface 112 an electrode array 113. Connected to the tablet 111 by a flexible cable is a six button puck 114 similar to that illustrated in FIG. 1 being freely manipulated by a user 115 and using its fine crosshairs to position precisely the center of a coil 117 over a drawing being digitized and displayed on the monitor 110. As disclosed in the present invention, the puck 114 shown in FIG. 9 could be replaced with one of those illustrated in FIGS. 1, 4 and 7.

Figure 10:
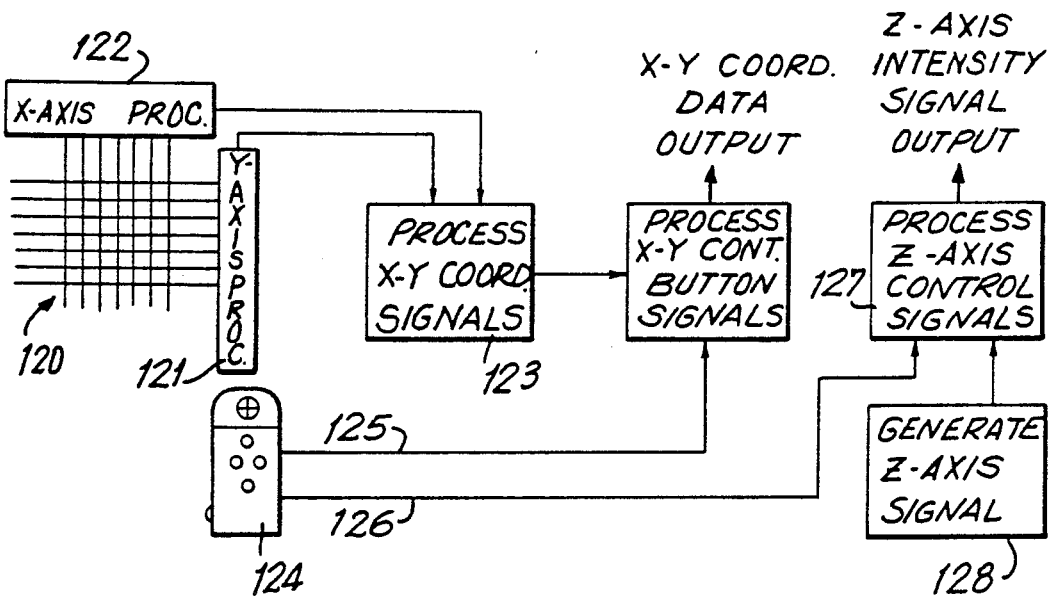
FIG. 10 is a block diagram of the signal processing circuitry of a system in accordance with the invention.

FIG. 10 further illustrates operation of the system. The conventional digitizer tablet has crossed electrode patterns 120 connected to scanning circuitry 121, 122, and collected signals are processed 123 to generate the X-Y coordinate data. The resultant information is appropriately modified in accordance with the control button signals inputted 125 from a puck 124 and outputted to a PC workstation. The analog control signals inputted 126 from the puck ar processed 127 to modify the value of a continuously generated Z-axis signal 128, and the resultant modified Z-axis signal outputted to the workstation.

It will be evident that other forms of analog switches can be used in place of those described, using the same and different technologies. For example, a slide switch can be used in place of the thumbwheel switch.

In addition, the invention is not limited to only one analog switch on the puck. Thus, two or more analog switches can be employed, each for controlling a different attribute of the display, for example, line width and line color. Similarly, not only can the analog control be used to give the user full threeaxis control for manipulation or design of three-dimensional objects, but also it can easily be extended to four or more dimensions using plural controls or the trackball which gives plural outputs.

Moreover, in the FIG. 1 embodiment as will be elaborated on below the amount of incrementing could be determined by the length of time the UP or DN button is depressed, in the same manner as a repeat key at a workstation keyboard. Moreover, the rate of change could be software controlled, and varied, again similarly to some cursor controls on a PC. For instance, slow or small incremental changes in the Z-axis signal value would take place in, say, the first 5 seconds of button depression, and faster or larger changes afterwards. Moreover, the rate of Z-axis signal changes, instead of being dependent on the button depression time, could be readily made dependent on button pressure. Thus, adding a pressure sensor to the UP and DN buttons would allow the user to cause the display screen cursor to move faster with more pressure or slower with less pressure.

It will further be understood that when referring to the added switch or control means for the Z-axis output signal, what is meant is that the Z-axis signals are multi-valued, not 2-valued, and thus represent a range of Z-axis values. However, this range can be expressed digitally by converting in a conventional A/D convertor the analog value to its digital equivalent, such as for an 8-bit A/D 1 of 256 possible values. Still further, the invention is not limited to the combination of the analog switch with a standard 4-button puck, but obviously could be used with a 16-button standard puck or with any other number of standard control buttons.

Figure 11:
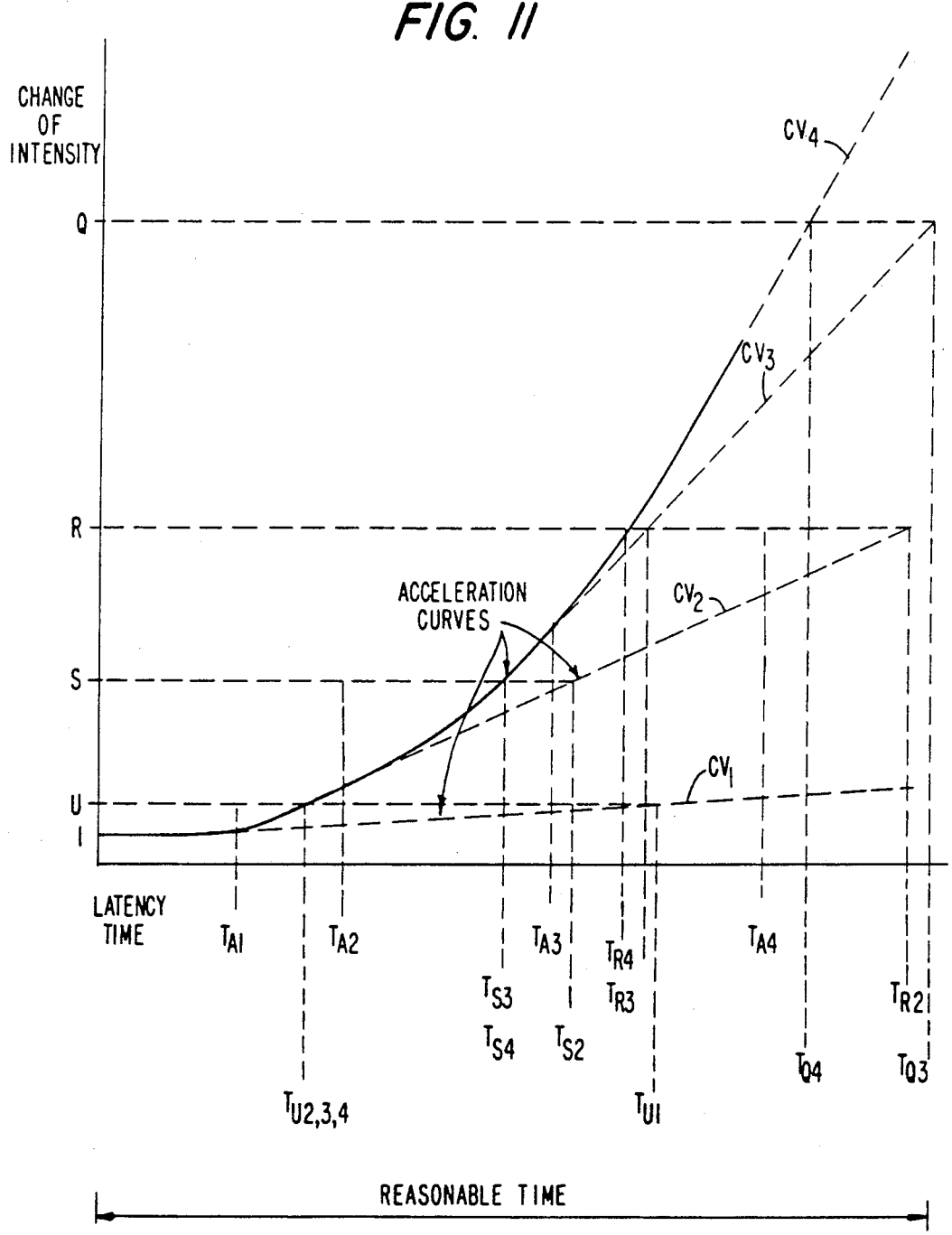
FIG. 11 shows various response characteristics to key closure time for different user applications.
Figure 12:
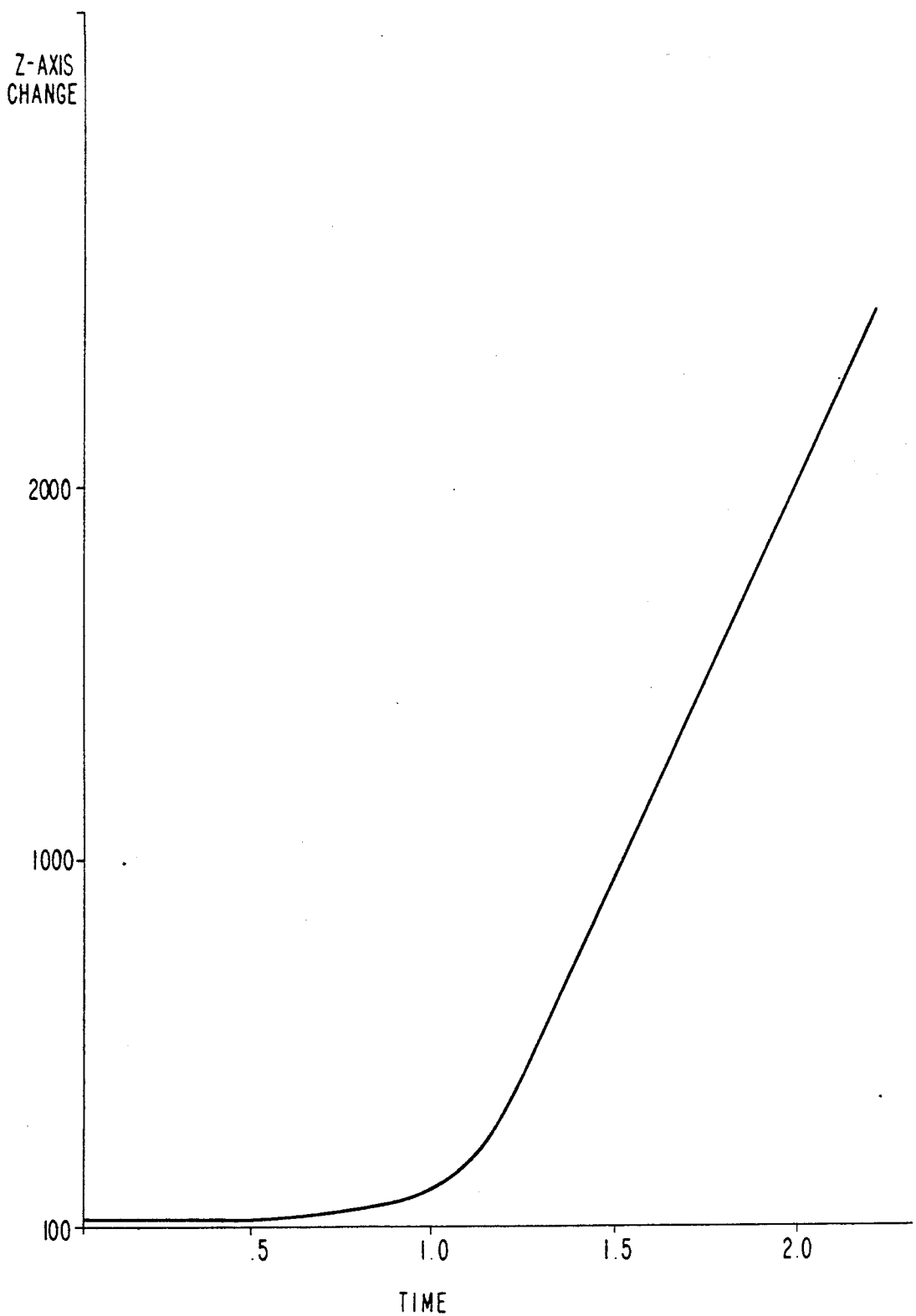
FIG. 12 is a graph illustrating a desired functional relationship between user operations and Z-axis signal output.

The term "multi-valued" as used herein is defined to mean that the output can be controlled over a range of values that will exceed two in number, and typically, for many applications, will substantially exceed two. The range of possible values will typically depend on the application. Two examples will illustrate the possibilities. One of the color standards for PC monitors permits a choice among 16 colors. This is achieved by transmitting one of 16 codes to the monitor. A control according to the invention can readily be provided with appropriate key combinations or sequences for choosing one of the 16 colors for display of a particular line or area with that particular color. In this instance, the range would cover 16 values. In another application using, say, a 60 inch tablet with a resolution of 1000 lines/inch, an X dimension of a drawing can therefore be varied over a range of 0-60,000. If a 3-dimensional illustration were desired with the same resolution and range, then a control in accordance with the invention with that wide-ranging capability would be required. In this instance, the range would cover 60,000 possible values. Such a control would likely use a construction providing the operation as depicted in FIGS. 11 and 12.

In some instances in the use of the control of the invention, a "value" is outputted that can be changed and thus controlled. The term "value" is being used in its broadest sense to include signal intensity, signal magnitude, or some other attribute representative of one of a range of values. Thus, the value outputted to select a color need not have a magnitude that is related to the color selected. On the other hand, many outputted values will more directly represent the desired effect, for example, a dimension in the Z direction, or a line width. With certain controls, such as the rheostat or variable resistance depicted in FIG. 5, the output is a true analog signal that varies continuously over the possible range. With other embodiments, such as that depicted in FIGS. 6-8, the output is a digital number representing a position of the trackball, with the range being determined by the trackball construction employed. With the A/D converter, the use of more bits to represent a value will determine the number of discrete outputs; for example, with 8 bits, 256 discrete numbers can be represented. With the embodiment using a keypress to increment or decrement an output value, the output will vary in small steps which, depending upon the number of steps, will determine how closely it will approximate a continuous function. Thus, the term "multi-valued" is intended to cover not only varying ranges of values typically exceeding 2 in number, but also values that can vary continuously or in discrete steps that may be equal (FIG. 1 embodiment) or unequal (FIG. 11 operation).

A further feature of the invention is that full resolution of the tablet is possible along all the axes. For example, suppose that the tablet resolution along the X and Y axes is 1000 lines per inch (LPI), a typical value. This same resolution (1000 LPI) could be built into the tablet hardware for the Z-axis, such that the length of a one-inch line along the Z-axis could be controlled to within 1 in 1000 steps.

Another important feature of the invention is the flexibility and versatility of the system. The function or performance of the Z-axis feature can be readily controlled by the manufacturer, but more importantly by the user. That is to say, the Z-axis information can be user programmable or user selectable, implemented in software, firmware or hardware.

For example, as hardware control in the thumbwheel and trackball embodiments of FIGS. 4, 6 and 7, operation can be modified by substituting different encoder wheels, thereby changing the mechanical advantage of the N-axis cursor.

With software or firmware, the operation of the N-axis cursor is readily selected or modified by the user. For instance, the user could select the rate of change of the N-axis cursor with thumbwheel or trackball motions or button presses. The acceleration and deceleration of Z-axis information can be user controlled. One way is to store a plurality of transfer function curves for the acceleration and deceleration functions, or to modify one or more applicable transfer function curves by computation. The transfer function curve desired could be user selectable or programmable, by command or within an application program. This would be very useful to graphics artists in constructing models.

The foregoing will be better understood from the following detailed explanation. The interpretation of the user's action in a multi-dimensional input environment should be considered to take into account ergonomic principles. For instance, with the puck of FIG. 1, at one extreme, one could interpret each UP/DN switch closure as described as an action intended to increment or decrement a value, for example, the magnitude, whereas, at the other extreme, one could interpret the length of time the switch remains closed as the action intended to continually increase or decrease the value. In the former case of the one extreme, increasing the value by an amount of 12 units, for example, would require 12 discrete button closures and releases, while in the latter case of the other extreme, one would hold the button closed for 12 units of time. Increasing by 1200 units would thus require 1200 discrete button closures, or a closure of 1200 units of time. Requiring one closure and release for each value change of one unit would not be feasible if large changes are anticipated, for example, in systems with high resolution. Conversely, if the "unit of time" referenced above is small, to allow for large changes in a small amount of time, one's ability to make small changes would be limited to that person's ability to close or release a button quickly and exactly. For example, if 0.01 seconds were chosen as the "unit of time", to allow for 1200 units in 12 seconds, one would have to press and release the button in 0.01 seconds ±0.005 seconds to produce a unit change.

In accordance with this aspect of the invention, the preferred implementation would be a combination of the advantages of both extremes, with a minimization of the disadvantages. In particular, to allow for small incremental changes without requiring fine user timing precision, a single closure or release within some reasonable time duration is interpreted as a single increment/decrement of one unit of resolution. Let this reasonable time duration be termed "latency time". After the latency time, if the button is still depressed, the device will automatically enter a time duration mode, where the change will be proportional to the subsequent time the button remains depressed. In order to accommodate potentially orders of magnitude differences in the amount of change required without incurring orders of magnitude differences in the amount of time required to effect this change, a non-linear response characteristic should be employed. For example, if the response were proportional to the square of the number of tenths of seconds the switch was depressed after the latency time, at 1 second the increments would be 1000 per second, while at 30 seconds the increments would be 900,000 per second, and a tenth of a second difference in letting go of the button would equate to a 90,000 difference in the amount of change to be effected. The preferred implementation would limit the rate of change to some reasonable amount, after which the system would revert to a linear relationship between time duration and the amount of change introduced. Let the time during the non-linear response period be termed the "acceleration time", and the time after the acceleration time be termed the "constant velocity time".

A typical response characteristic, in terms of change of value intensity, is shown graphically in FIG. 11. FIG. 11 shows curves labelled $CV_1$–$CV_4$ representing different functions of change of value of a Z-axis signal as a function of latency time. The letters Q, R, S, U along the ordinate represent different rates of value change, while time T is plotted along the abscissa, with subscription to designate particular time durations within a preset reasonable time of, say, 2 seconds, meaning that the user desired change over the total range of allowable variation will be effected within the chosen 2 second response time. Depending on the dynamic response of the system desired, one could choose different acceleration times to affect the preferred response, or a different acceleration curve. If most of the expected magnitudes of change, for example, were expected to be of the order of R as shown in FIG. 11, then one would probably choose a response which was akin to the acceleration curves labelled $CV_2$ or $CV_3$, since it would take an "unreasonable" amount of time for a system with a $CV_1$ response to effect that change. In contrast, using the $CV_2$ response characteristic would effect that same change R at $TR_2$ and response curve $CV_3$ would effect it at $TR_3$. As the rate is steeper at $CV_3$, however, it would be more difficult to stop the change exactly at R as compared to using the $CV_2$ curve. If the typical change request, on the other hand, is expected to be of the order U, $CV_1$ would be a preferred approach, while $CV_4$ would be preferred if the exerted change is Q or more.

The subscripted T values illustrate the different response time performance obtained for the different ranges of values along the ordinate, demonstrating quite clearly that the application of the user or the user should determine the kind of response curve to implement to maintain reasonable response times within the degree of accuracy desired. Thus, as can be seen, the choice of response characteristics is very much a function of the expected use of the device, in terms of expected changes of values and the user's perception of "reasonable time" to effect these charges. Our preferred implementation of this feature of the invention provides a predetermined set of parameters for these characteristics. An example of one useful parameter set is: 0.5 second latency time, a 100 unit expected average change, and a one second expected response time to execute a 100 unit change, with a 2,000 unit change taking no longer than 2 seconds. That response characteristic is as shown in FIG. 12. However, it is understood that the invention is not limited to the specific characteristic of FIG. 12. Preferably, the system allows for the user to adjust these parameters to suit his or her specific requirements.

In this preferred implementation, the user is given the ability to adjust the latency time, the acceleration time, and the rate of acceleration. Alternative implementations could allow for the adjustment of other parameter to modify the shape of the response curve as desired, but it is our current belief that the adjustment of these three parameters will be sufficient to provide for a large degree of flexibility to meet most user requirements.

Figure 13:
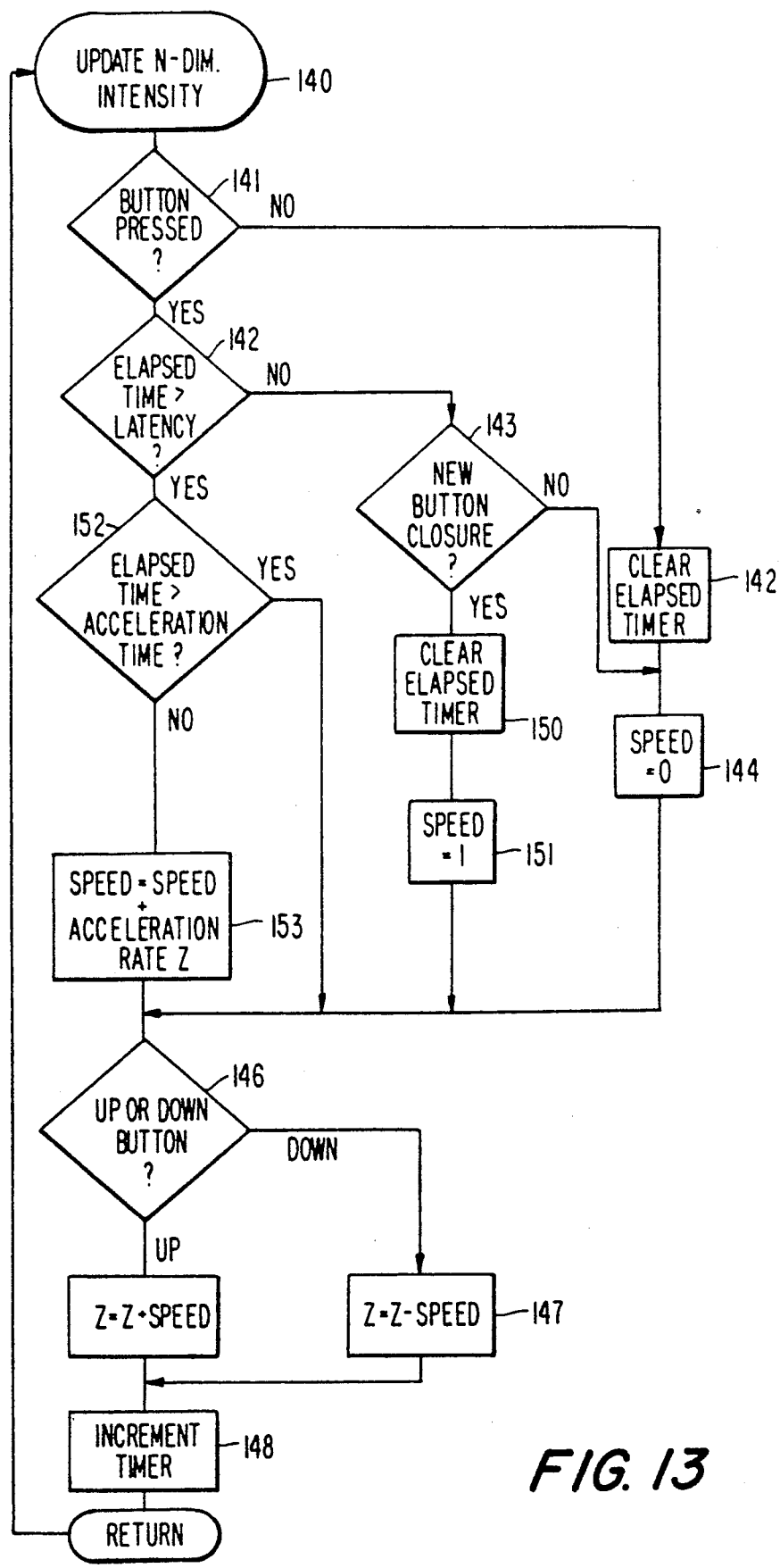
FIG. 13 is a flow chart illustrating one way of implementing in software user control of Z-axis signal response.

A sample flowchart for the implementation of a latencyacceleration-constant velocity algorithm is shown is FIG. 13. In this particular instance, the circuit of FIG. 2 would be utilized, with the signal processor programmed to respond not only to UP/DN switch closures, but also to the switch closure time. It will be evident that the use of software to produce a response characteristic as shown in FIG. 12 has the great advantage that, simply by replacing constants in the program, the functional relationship are easily varied, or alternatively a set of routines can be made available, each providing a desired discrete functional relationship, such as the ones illustrated in FIGS. 11 and 12, with the user given the option to select the particular relationship desired depending upon the application. Thus, it will be understood that the invention is not limited to the specific algorithm illustrated in FIG. 13, and that will now be explained.

The first block 140 represents the setting of some default intensity, representing, for instance, a typical line width. In block 141, pressing of an UP or DN button is detected. The algorithm basically implements a polling technique, so the condition of the UP or DN button is continuously being sensed. If no button-press is detected, control branches to block 142 which clears an internal elapsed time counter, the velocity of the parameter being changed, speed, is set to zero, the remaining blocks, discussed below, represent the constant velocity mode and change nothing, and control return to block 140 which maintains the default value.

When a button-press is detected at block 141, a test is made at block 142 whether the elapsed time exceeds the preset latency time. If the test is negative, control branches to block 143 which tests whether it is the same button as previously pressed or a new button. If it is the same button, control branches to block 144 when again sets the speed to zero. The program flow then continues at block 146, where a test is made to determine whether the UP or DN button was pressed. If the DN button, control branches to block 147 where the velocity change rate or acceleration, Z, in response to button-press time (the ordinate in FIG. 12) is set to its previous value less the value of speed. This represents a constant velocity. The elapsed time counter is then incremented at block 148, and control loops back to block 140 to update the Z-axis or N-dimensional value. If the test at block 143 signifies a new button closure, the elapsed timer is cleared at 150, the speed is set at 1 at block 151, and the remaining actions starting at block 146 are the same as previously described.

Returning now to block 142, if the elapsed time does exceed the set latency time, control falls through to block 152 which tests whether the elapsed time exceeds the acceleration time. If YES, control branches to block 146 and continues as described earlier into the constant velocity routines. If NO, control falls through to block 153 which sets the speed at the previous value plus the acceleration rate Z, and execution follows as above described.

The result is that the user, via an initial setting, can select a desired latency time and acceleration time, and while executing the application, i.e., the drawing or other task, can modify, via button presses, the acceleration rate of change of the N-dimensional value. This will afford the user a large degree of flexibility in carrying out his or her task in an optimum manner.

It will be understood that, though the previous description refers to the Z-axis signal, the latter will be understood to mean any N-dimensional signal to signify the chosen parameter whose display is being modified in accordance with button switch closures.

It will also be appreciated that this aspect of the invention is not limited to button switches as on a puck, but is equally applicable to button switches performing similar functions on a stylus. It can also readily be applied to a stylus using a tip pressure sensor, where the user to accelerate the action desired could simply press the tip all the way into the stylus housing. This action would execute the program illustrated in FIG. 13 in the same manner as the hold-down button on the puck of FIG. 1.

While the invention has been described and illustrated in connection with preferred embodiments, many variations and modifications as will be evident to those skilled in this art may be made therein without departing from the spirit of the invention, and the invention as set forth in the appended claims is thus not to be limited to the precise details of construction set forth above as such variations and modifications are intended to be included within the scope of the appended claims.

What is claimed is:

1. A graphics digitizer tablet comprising:
  (a) a working surface in an X-Y plane for supporting a work diagram,
  (b) means and a puck for generating when activated X-Y coordinate data representing the location of the puck relative to the working surface,
  (c) first control means mounted on the puck for manipulation by a user,
  (d) means connected to the puck first control means for generating a multi-valued signal in response to manipulation by the user of the control means.

2. The digitizer tablet of claim 1, wherein the puck further comprises second control means for manipulation by the user, said second control means comprising plural button switches for controlling the X-Y coordinate data.

3. A graphics digitizer tablet comprising:
  (a) a working surface in an X-Y plane for supporting a work diagram,
  (b) means and a puck for generating when activated X-Y coordinate data representing the location of the puck relative to the working surface, said puck comprising a hand-held member having a flat bottom and a crosshair reticule for accurate positioning of the puck by the user on the tablet working surface,
  (c) first control means mounted on the puck for manipulation by a user,
  (d) means connected to the puck first control means for generating a multi-valued signal in response to manipulation by the user of the control means,
  (e) second control means on the puck for manipulation by the user, said second control means comprising plural button switches for controlling the X-Y coordinate data.

4. The graphics tablet of claim 3, wherein the means of (d) comprises means for generating in response to the first control member position a signal representative of a parameter of a work diagram other than its X and Y dimensions.

5. The graphics tablet of claim 4, in combination with a display device for displaying a line diagram corresponding to the work diagrams, said parameter comprising the line width or color of the work diagram.

6. The graphics tablet of claim 3, in combination with a display device for displaying a line diagram corresponding to the work diagram, said parameter comprising a dimension of the diagram along the Z-axis of an X-Y-Z coordinate system.

7. A puck for use with a digitizer tablet, said puck comprising a hand-held housing having reticle means for accurate X-Y positioning of the puck, at least control first means on the housing for transmitting to the tablet control or command information related to X-Y coordinate data representative of the puck position, and at least second means on the housing for controlling transmission to the tablet of additional information not related to the X-Y coordinate data, said first means comprising plural button switches, said second means comprising up and down button switches connected when actuated to increase and decrease, respectively, the value of the additional information.

8. A puck for use with a digitizer tablet, said puck comprising a hand-held housing having reticle means for accurate X-Y positioning of the puck, at least control first means on the housing for transmitting to the tablet control or command information related to X-Y coordinate data representative of the puck position, and at least second means on the housing for controlling transmission to the tablet of additional information not related to the X-Y coordinate data, said first means comprises plural button switches, said second means comprising a thumbwheel device.

9. The puck of claim 8, wherein said second means further comprises a variable resistance connected to the thumbwheel device.

10. A graphics digitizer tablet comprising:
(a) a working surface in an X-Y plane for supporting a work diagram,
(b) a pointing device having an electrode for cooperating with the digitizer,
(c) means connected to the digitizer and pointing device for generating when activated X-Y coordinate data representing the location of the pointing device relative to the working surface,
(d) means for generating at least two N-dimensional signals representing an image dimension other than its X and Y coordinate,
(e) control means connected to the N-dimensional signal generating means for modifying the N-dimensional signals,
(f) means responsive to the control means for modifying the manner in which the N-dimensional signals respond to the control means.

11. The graphics tablet of claim 10, wherein the means of (f) comprises circuitry responsive to a command from a user.

12. The graphics tablet of claim 10, wherein the means of (f) comprises means responsive to a software program statement.

13. A graphics digitizer tablet comprising:
(a) a working surface in an X-Y plane for supporting a work diagram,
(b) a pointing device having an electrode for cooperating with the digitizer,
(c) means connected to the digitizer and pointing device for generating when activated X-Y coordinate data representing the location of the pointing device relative to the working surface,
(d) means for generating an N-dimensional signal representing an image dimension other than its X and Y coordinates,
(e) control means connected to the N-dimensional signal generating means for modifying the N-dimensional signal,
(f) means responsive to the control means for modifying the manner in which the N-dimensional signal responds to the control means,
(g) means for establishing a transfer function curve representing an acceleration function for modifying the N-dimensional signal.

14. The graphics tablet of claim 13, further comprising means under program or command control for modifying the said transfer function curve.

15. The graphics tablet of claim 13, wherein the control means includes means for enabling a user to select a desired transfer function curve.

16. The graphics tablet of claim 10, wherein the control means includes user actuable elements mounted on the pointing device.

17. The graphics tablet of claim 16, wherein the user actuable elements include button switches.

18. A graphics digitizer tablet comprising:
(a) a working surface in an X-Y plane for supporting a work diagram,
(b) a pointing device having an electrode for cooperating with the digitizer,
(c) means connected to the digitizer and pointing device for generating when activated X-Y coordinate data representing the location of the pointing device relative to the working surface,
(d) means for generating an N-dimensional signal representing an image dimension other than its X and Y coordinates,
(e) control means connected to the N-dimensional signal generating means for modifying the N-dimensional signal, said control means including user actuable elements mounted on the pointing device,
(f) means responsive to the control means for modifying the manner in which the N-dimensional signal responds to the control means,
(g) means responsive to the elapsed time of actuation of an actuable element for modifying the rate of change of the N-dimensional signal.

19. The graphics tablet of claim 18, wherein the means of (f) comprises a user-selectable latency time below which the means for modifying the rate of change is rendered inactive.

20. The graphics tablet of claim 19, wherein the means of (f) comprises means for establishing an acceleration time during which time period the rate of change accelerates.

21. The graphics tablet of claim 20, wherein the means of (f) further comprises means for establishing a constant velocity of change of the N-dimensional signal following expiration of the acceleration time.

22. The graphics tablet of claim 20, wherein the control means of (e) comprises at least two actuable elements, said two actuable elements representing, respectively, an increase and a decrease in the N-dimensional signal.

23. A puck for use with a digitizer tablet, said puck comprising a hand-held housing having reticle means for accurate X-Y positioning on the puck, at least control first means on the housing for transmitting to the tablet control or command information related to X-Y coordinate data representative of the puck position, and at least second means on the housing for controlling transmission to the tablet of additional information not related to the X-Y coordinate data, said first means comprising plural button switches, said second means comprising up and down button switches, means for incrementing connected to the up switch and means for decrementing connected to the down switch.

24. A puck for use with a digitizer tablet, said puck comprising a hand-held housing having a reticle means for accurate X-Y positioning of the puck, at least control first means on the housing for transmitting to the tablet control or command information related to X-Y coordinate data representative of the puck position, and at least second means on the housing for controlling transmission to the tablet of additional information not related to the X-Y coordinate data, said first means comprising plural button switches, said second means comprising a thumbwheel device and an optical encoder connected to the thumbwheel.

25. A puck for use with a digitizer tablet, said puck comprising a hand-held housing having reticle means for accurate X-Y positioning of the puck, at least control first means on the housing for transmitting to the tablet control or command information related to X-Y coordinate data representative of the puck position, and at least second means on the housing for controlling transmission to the tablet of additional information not related to the X-Y coordinate data, said first means comprising plural button switches, said second means comprising a trackball.

* * * * *